United States Patent
Welle

(10) Patent No.: US 11,067,427 B2
(45) Date of Patent: Jul. 20, 2021

(54) ANTENNA DEVICE AND METHOD FOR OPERATING AN ANTENNA DEVICE

(71) Applicant: VEGA GRIESHABER KG, Wolfach (DE)

(72) Inventor: Roland Welle, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 267 days.

(21) Appl. No.: 15/776,449

(22) PCT Filed: Nov. 17, 2015

(86) PCT No.: PCT/EP2015/076859
§ 371 (c)(1),
(2) Date: May 16, 2018

(87) PCT Pub. No.: WO2017/084701
PCT Pub. Date: May 26, 2017

(65) Prior Publication Data
US 2018/0335332 A1    Nov. 22, 2018

(51) Int. Cl.
*G01F 23/284*    (2006.01)
*H01Q 1/22*    (2006.01)
*H01Q 3/08*    (2006.01)
*H01Q 21/06*    (2006.01)
*H01Q 21/08*    (2006.01)
(Continued)

(52) U.S. Cl.
CPC .............. *G01F 23/284* (2013.01); *G01S 7/40* (2013.01); *G01S 13/426* (2013.01); *G01S 13/88* (2013.01); *G01S 13/89* (2013.01); *H01Q 1/225* (2013.01); *H01Q 3/08* (2013.01); *H01Q 19/062* (2013.01); *H01Q 21/065* (2013.01); *H01Q 21/08* (2013.01)

(58) Field of Classification Search
CPC ...... G01F 23/284; G01S 13/426; G01S 13/88; G01S 7/40; G01S 13/89; H01Q 19/062; H01Q 1/225; H01Q 3/08; H01Q 21/065; H01Q 21/08
USPC .......................................................... 342/124
See application file for complete search history.

(56) References Cited

U.S. PATENT DOCUMENTS 7,515,476 B2 * 4/2009 Park .................. G11C 16/0483
                                                       365/185.17
7,535,571 B2    5/2009 Dietz et al.
(Continued)

FOREIGN PATENT DOCUMENTS

CN    101113921 A    1/2008
CN    102356303 A    2/2012
(Continued)

OTHER PUBLICATIONS

Machine translation of DE20122754 (Year: 2007).*
(Continued)

*Primary Examiner* — Frank J McGue
(74) *Attorney, Agent, or Firm* — Oblon, McClelland, Maier & Neustadt, L.L.P.

(57) ABSTRACT

An antenna apparatus that comprises processing circuitry that transmits a transmission signal by at least one transmitter and that receives at least two reception signals by at least one receiver. The antenna apparatus is used for topology measurement and can switch to outright fill level measurement if there is a deviation from a threshold for a quality measure.

13 Claims, 3 Drawing Sheets

(51) Int. Cl.
*G01S 13/42* (2006.01)
*G01S 13/88* (2006.01)
*G01S 7/40* (2006.01)
*G01S 13/89* (2006.01)
*H01Q 19/06* (2006.01)

(56) References Cited

U.S. PATENT DOCUMENTS

| | | | |
|---|---|---|---|
| 8,350,751 B2 | 1/2013 | Edvardsson et al. | |
| 9,419,343 B2 | 8/2016 | Dieterle | |
| 9,739,877 B2 | 8/2017 | Fehrenbach et al. | |
| 10,260,928 B2 | 4/2019 | Welle et al. | |
| 2004/0031335 A1* | 2/2004 | Fromme | G01B 11/24 73/865 |
| 2004/0227667 A1* | 11/2004 | Sievenpiper | H01Q 3/26 343/700 MS |
| 2009/0051593 A1 | 2/2009 | Wiesbeck et al. | |
| 2009/0299662 A1 | 12/2009 | Fehrenbach et al. | |
| 2010/0156702 A1* | 6/2010 | Edvardsson | G01F 23/284 342/124 |
| 2012/0221261 A1 | 8/2012 | Fehrenbach et al. | |
| 2015/0007653 A1* | 1/2015 | Fehrenbach | G01S 13/87 73/198 |
| 2016/0054167 A1* | 2/2016 | Welle | G01F 23/284 342/124 |
| 2016/0352437 A1* | 12/2016 | Welle | H04B 17/103 |
| 2017/0167865 A1 | 6/2017 | Welle et al. | |

FOREIGN PATENT DOCUMENTS

| | | |
|---|---|---|
| CN | 104165671 A | 11/2014 |
| CN | 104374446 A | 2/2015 |
| DE | 201 22 754 U1 | 7/2007 |
| DE | 201 22 754 U1 | 8/2007 |
| DE | 10 2007 039 897 B3 | 10/2008 |
| EP | 2 128 576 A1 | 12/2009 |
| EP | 2 803 952 A1 | 11/2014 |
| TW | 201531671 A | 8/2015 |
| WO | WO 2015/120879 A1 | 8/2015 |
| WO | WO 2015/120880 A1 | 8/2015 |
| WO | WO 2015/120885 A1 | 8/2015 |

OTHER PUBLICATIONS

International Search Report dated Aug. 30, 2016 in PCT/EP2015/076859 filed Nov. 17, 2015.
Combined Chinese Office Action and Search Report dated Aug. 27, 2019 in Patent Application No. 201580085055.X (with English translation of Categories of Cited Documents), 13 pages.

* cited by examiner

ANTENNA DEVICE AND METHOD FOR OPERATING AN ANTENNA DEVICE

FIELD OF THE INVENTION

The invention relates to the field of measurement technology. In particular, the invention relates to measuring fill levels by means of electromagnetic waves.

BACKGROUND OF THE INVENTION

Topology-detecting fill level measurement devices can be used to determine the fill level of a filling material or bulk material in a container. Said measurement devices sample the filling material surface and/or bulk material surface by means of an electronic signal and can also utilise the information relating to the three-dimensional surface topology of the filling material and/or bulk material, derived from the sampling, in order to establish the volume of the filling material, assuming that the surface area below the filling material is known, and/or to establish the mass, or other variables that can be derived therefrom, when the density is known. For the sampling, a beam from an electromagnetic wave is guided over the filling material or the bulk material and the reflection behaviour is monitored and analysed at various angles.

DE 10 2007 039 397 B3 describes a method for operating an antenna group having a plurality of transmitters and a plurality of receivers, and an associated apparatus. WO 2015/052699 A1 relates to a method for analysing the contents of a container by means of a plurality of acoustic transmitter/receiver arrays. WO 2015/120885 A1 relates to a measuring apparatus and to a method for detecting properties of an object.

SUMMARY OF THE INVENTION

According to one aspect of the present invention, an antenna apparatus, a fill level measurement device and a method for operating an antenna apparatus may be described.

It may be required to facilitate efficient measurement of fill levels.

The independent claims define the subject matter of the invention. Further embodiments of the invention can be found in the dependent claims and the following description.

According to one aspect of the invention, an antenna apparatus is described which comprises a control unit, an analysis unit, at least one first transmitter unit and at least one first receiver unit. The control unit is configured to transmit a transmission signal by means of the at least one first transmitter unit, and the analysis unit is configured to receive at least one reception signal by means of the at least one first receiver unit. In addition, the control unit is configured to operate the at least one first transmitter unit such that a profile of a surface of an object can be determined by means of the analysis unit from the at least one reception signal that has been received. In one example, the control unit and the analysis unit can be linked in order to control one another. In another example, the control unit and the analysis unit can be operated independently of one another. The analysis unit is further configured to identify an error when detecting the profile of the surface of the object and, upon identifying the error, to actuate the control unit and/or the transmitter unit such that the analysis unit determines a distance of the surface of the object from the transmitter unit and/or from the receiver unit instead of determining the profile of the surface of the object. The distance may be measured in a specifiable, single spatial direction, for example in a direction that is substantially perpendicular to the object surface and/or in a direction in which the antenna apparatus is stuck in the case of a defect. In the event of an error, alternatively or in addition to measuring the distance, an error message can also be output which indicates the poor quality of a measurement or discloses a defect. The error message can be output on a display or can be output acoustically via a beeper.

In other words, a topology measurement apparatus, which is configured to detect the surface of an object or the profile of a surface, can be switched in the event of a error in a measuring apparatus so as to carry out an outright distance measurement in substantially only a single spatial direction. An error may be a mechanical defect or also a decrease in the quality of a measurement. For example, a measuring method which, in a first mode of operation, provides for a fill level to be established by determining a profile of a surface, can be switched into a second mode of operation in which the fill level is established by a distance measurement at a specifiable position. This can mean that determining a profile of a surface from a plurality of distance measurements is switched into determining a distance from a single distance measurement. When an error occurs, the fill level may thus be established by a distance measurement, after the switch from topology measurement to distance measurement, it being possible for the number of measurements per fill level measurement value to be reduced. It may thus also be possible to switch from receiving at least two reception signals to receiving a single reception signal in order to calculate the fill level.

According to another aspect of the invention, an antenna apparatus is provided which comprises a control unit, an analysis unit, at least one first transmitter unit and at least one first receiver unit. The control unit is configured to transmit a transmission signal, for example an electromagnetic wave, by means of the at least one transmitter unit. The analysis unit is configured to receive at least two reception signals by means of the at least one first receiver unit. The at least one first receiver unit and/or the plurality of receiver units can receive the reception signal either substantially simultaneously or in a deferred manner.

The analysis unit is configured to determine, from the at least two reception signals, at least two echo curves for at least two specifiable spatial directions in order to detect a surface of an object. In order to detect a surface of an object, a measurement result for a surface profile of an object may be determined, for example by a plurality of distances from various points on the surface being determined, and a measured value being established therefrom. The analysis unit is further configured to determine a quality measure for the at least two reception signals from the measurement results of the reception signals for at least two different spatial angles. The quality measure may be for example a strength of the reception signal or a signal-to-noise ratio of the reception signal. If the quality measure deviates from a specifiable threshold for the quality measure, thus if a threshold for the quality measure is exceeded or is not met, the analysis unit is also configured, for the at least two reception signals, to instruct the transmitter unit to increase an energy of the transmission signal, and to determine a single echo curve for a single specifiable spatial direction.

In other words, the quality of a topology measurement or the quality of a measurement of a profile of a surface of an object may be determined. If the quality of the measurement does not correspond to a specifiable value, topology measurement may be switched to outright fill level measurement. While, for topology measurement, echo curves are monitored which are received for different spatial directions and/or are computed in the sensor, in the antenna apparatus and/or in the fill level measurement device, and in particular in the analysis unit, in the case of outright fill level measurement only one echo curve is received and/or computed from a single spatial direction in order to reach a measured value, for example a fill level. The single spatial direction may extend substantially perpendicularly to the fill level surface. The single spatial direction can, however, also be selected such that the energy of a signal received in this direction is at a maximum compared with other reception directions. In order to determine the reception signal in one spatial direction, a transmission signal that is focused in two spatial directions and a correspondingly focused reception signal may be used. Signals having a low degree of scattering may thus be used. Lenses or a horn antenna can be used for corresponding focusing. Analogous beamforming by targeted superposition of a plurality of analogous transmission signals that are set at corresponding phase angles can also ensure appropriate focusing.

According to another aspect of the present invention, a method for operating an antenna apparatus is provided which comprises transmitting a transmission signal by means of at least one first transmitter unit, and receiving at least two reception signals by means of at least one first receiver unit. The method further provides for determining a profile of a surface of an object from the at least two reception signals received and identifying an error that occurs when determining the profile of the surface of the object. In response to identifying the occurrence of an error, the method provides for the control unit to be actuated such that the analysis unit determines a distance of the surface of the object from the transmitter unit and/or from the receiver unit instead of determining the profile of the surface of the object.

In one example, a method for operating an antenna apparatus is provided which comprises transmitting a transmission signal by means of the at least one transmitter unit, and receiving at least two reception signals by means of at least one receiver unit. The method can also provide for at least two echo curves for at least two specifiable spatial directions to be determined from the at least two reception signals in order to detect a surface of an object. Furthermore, the method determines a quality measure for the at least two reception signals and increases an energy of the transmission signal and/or the reception signal; if the quality measure deviates from a specifiable threshold for the quality measure for the at least two reception signals, the method determines a single echo curve for a single specifiable spatial direction.

In a further example, in the case of mechanical sampling by physically adjusting an adjustment unit comprising a single transmitter unit and a single receiver unit, a transmission signal and an associated reception signal, which emerges from the transmission signal as a result of reflection on the object surface, may be transmitted and/or received in temporal succession for different spatial directions. Alternatively or in addition, an antenna array can be used that uses a plurality of transmitter units and/or a plurality of receiver units in order to make it possible to sample the object surface by means of digital beamforming (DBF). Digital beamforming involves sampling by mathematical methods.

According to another aspect of the present invention, a fill level measurement device comprising an antenna apparatus according to the invention is provided. The fill level measurement device can comprise a processor. In addition, a computer-readable storage medium having a program code and a program element may be provided, which code/element, when executed by a processor, carries out the method for operating an antenna apparatus.

According to another aspect of the present invention, the antenna apparatus comprises at least one second receiver unit. Furthermore, the analysis unit is configured to receive by means of each of the at least one first receiver unit and the at least one second receiver unit one of the at least two reception signals; and, if the quality measure deviates from the specifiable threshold for the quality measure, the analysis unit can transmit an additional transmission signal. In one example, the transmission can take place by means of one of the at least one first receiver unit and the at least one second receiver unit. For example, the analysis unit can also instruct the control unit to transmit such an additional signal. In order to be used to transmit a signal, the receiver unit can be designed as a transmitter/receiver unit. The analysis unit can use the transmitter unit to trigger the transmission of the additional signal. Transmitting the additional transmission signal can result in the two signals overlapping such that the energy of the transmission signal is increased. The analysis unit then provides, however, for substantially only a single echo curve to be determined for the single specifiable spatial direction.

The signal quality may be impaired by contaminants within a container. Increasing the energy can allow fill levels to be established despite such contaminants, and can allow only a limited determination of the surface profile of an object. In another example, the high-energy measurement can be used for a plausibility measurement in order to verify another measurement, such as a topology measurement.

According to further aspects of the present invention, at least one second or a plurality of transmitter units can be used, which facilitate a time-division multiplexing mode, a frequency-division multiplexing mode and/or a code-division multiplexing mode, and can be operated in such a mode. The control unit may activate the transmitter units according to a timing pattern corresponding to the time-division multiplexing pattern, or said unit may modulate the transmission signal by means of a corresponding frequency signal or a code. Furthermore, additionally or alternatively, a mechanical adjustment unit may be provided which makes it possible to mechanically adjust the spatial angle in order to establish echo curves from different spatial directions. In addition, the signal energy can be increased not only by sending an additional transmission signal by means of an additional transmitter unit, a receiver unit and/or by means of a transmitter/receiver unit; an energy adjustment unit may also be provided, which allows the transmission energy to be increased if a fill level measurement is carried out in only a single spatial direction. The arrangement of transmitter elements, receiver elements and/or transmitter/receiver elements at distances from one another that are smaller than or equal to a half-wavelength may result in good results during signal computation. By means of a time-division multiplexing mode, an artificial reduction of the distances between the elements can also be emulated by virtual arrays being formed from the actual arrays. A virtual array is formed by the positions of the transmitter units and the receiver units, operated according to the time-division multiplexing method, being mathematically offset against the timing pattern, such that the temporally sequential operation appears as the operation of a virtual antenna at one point in time. The design of an antenna apparatus, a fill level measurement device, a transmitter unit and/or an analysis unit as a two-line device may allow power to be supplied to a load via a two-wire line, and may allow data to be transferred via the same line.

According to another aspect of the present invention, the antenna apparatus comprises an adjustment unit for mechanically adjusting the at least one first transmitter unit and/or the at least one first receiver unit in order to determine the profile of the surface of the object by mechanically adjusting the at least one first transmitter unit and/or the at least one first receiver unit. In one example, the control unit may be connected to an angle detection unit or an angle detection component which can determine the position of the mechanically adjusted antenna apparatus. The control unit may also be configured such that the reception signals received, and in particular the echo curves derived therefrom, are linked to the position in order to determine a topology. Upon the identification of an error, the analysis unit is also configured to rigidly fix the adjustment unit in a specifiable position, and/or if the error is such that the adjustment unit can no longer move, e.g. if a motor breaks down, said unit is configured to determine the position of the antenna apparatus. In the case of an error, the analysis unit is also configured to output an error message and/or to determine the distance of the surface of the object from the transmitter unit and/or from the receiver unit in said rigidly fixed position. The established position of the antenna apparatus may be used to compensate for possible deviations from the perpendicular position with respect to the object surface when the distance of the object surface from the transmitter unit and/or from the receiver unit is determined.

BRIEF DESCRIPTION OF THE FIGURES

Further exemplary embodiments of the present invention are described below with reference to the drawings.

DETAILED DESCRIPTION OF EMBODIMENTS

Figure 1:
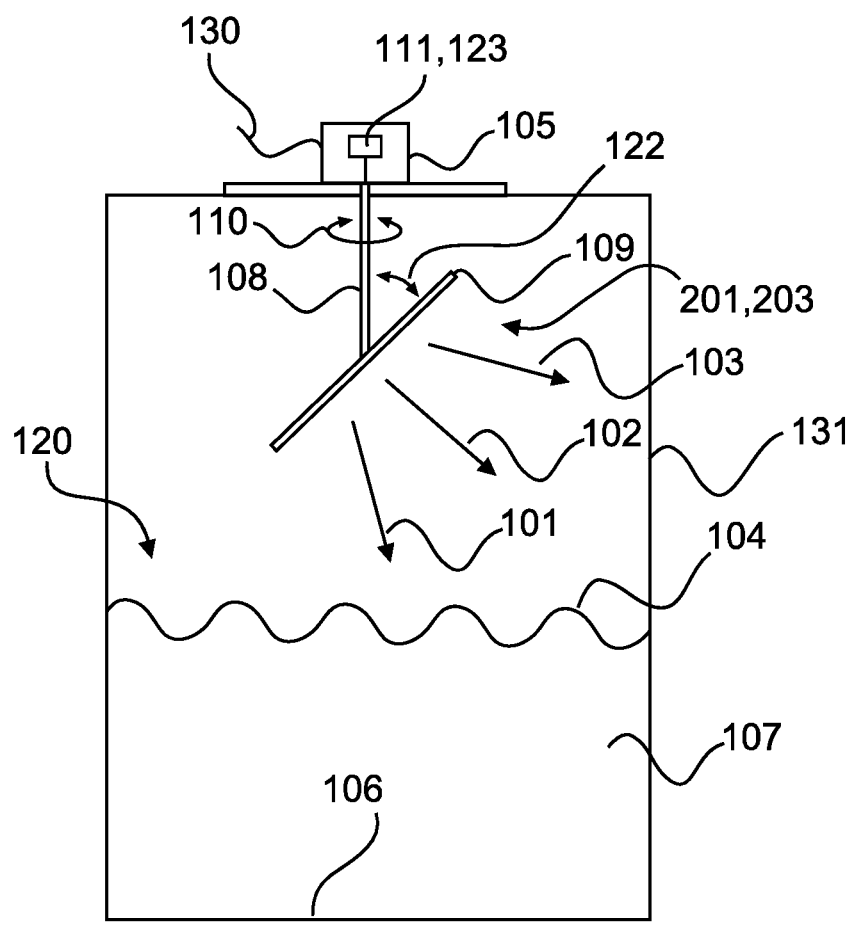
FIG. 1 shows a fill level measurement device according to an exemplary embodiment of the present invention.

The views in the drawings are schematic and not to scale. In the following description of FIG. 1 to 5, the same reference signs are used for the same or equivalent elements.

Without loss of generality, the following description of the figures may substantially refer to a linear antenna 201. The description and principles shall also apply accordingly to the two-dimensional array antenna 203, however.

FIG. 1 shows a fill level measurement device 105 or a topology-detecting radar measurement device 105 according to an exemplary embodiment of the present invention. The measurement device 105 or field device 105, in particular the fill level measurement device 105, is capable of detecting echo signals or echo curves from different angular ranges 101, 102, 103 or main reception directions 101, 102, 103. The fill level measurement device 105 comprises a control unit 111 and an analysis unit 123 and is powered via the two-line connection 130. The two-line connection 130 can also be used to transfer data, for example in order to forward the established fill level to a central control room (not shown in FIG. 1). The angular ranges 101, 102, 103 are to be considered as examples of adjustable main beam directions or of adjustable main reception directions. An angular range 122 of from 0° bis 180° can be detected by means of the arrangement shown in FIG. 1, depending on the adjustment and the orientation of the antenna apparatus 201, 203. By rotating the antenna holder 108, the entire three-dimensional surface 120 of the object 104 can thus be detected. For each echo curve established in a spatial direction, the distance from the relevant point on the surface of the object 104 is established, for example the distance from the bulk material 104 or the filling material 104. By numerically integrating these distance values, and when postulating a planar surface 106, in particular a planar container base 106, below the bulk material 104 or the filling material 104, the volume of the bulk material stockpile 107 can be established.

For mechanical sampling, the fill level measurement device 105 comprises the antenna holder 108 having the antenna base 109 for fastening an antenna 201, 203 or antenna apparatus 201, 203. The antenna base 109 and the antenna holder 108 form an adjustment unit, which can be oriented by the control unit 111. The adjustment unit 109, 108 can be controlled by a motor. In this way, a motor-controlled planar antenna or a motor-controlled horn antenna can be realised depending on which type of antenna apparatus is mounted on the antenna base 109. Depending on the design of the fill level measurement device 105, the antenna base 109 makes it possible to mechanically adjust a main beam direction of an antenna apparatus 201, 203 attached to the antenna base 109, for example by rotating the antenna holder 108 about an axis of rotation and/or by tilting about a tilt angle 122. The rotation is indicated by the arrow 110 and the tilt is represented by the arrow 122.

In addition or alternatively to the mechanical rotation 110 and/or the tilting 122, the main beam direction 101, 102, 103 or main reception direction 101, 102, 103 of the antenna 201, 203 or antenna apparatus 201, 203 can be supplemented or replaced by digital beamforming methods.

If an antenna array comprising at least one transmitter unit and at least two receiver units is used, a plurality of main beam directions and/or main reception directions can be established per measurement, and in particular a plurality of echo curves from this plurality of spatial directions. In order to be able to sample the surface 120 of the bulk material 104 or another object 104, a transmission signal is sent from a transmitter unit of the antenna apparatus in substantially all spatial directions. The region of interest is lit up as it were, by means of an isotropic radiator. By analysing the signals received by the receiver units of the antenna apparatus, a reception signal can be determined in any desired spatial direction 101, 102, 103. For example, a reception signal can be formed in the various angular ranges 101, 102, 103 by means of only one measurement in order to detect the surface 120 of the bulk material 104 at the different angular ranges. A reception signal can be guided over the surface 120 of the filling material by detecting a reception beam at the different angular ranges. Digital beamforming methods are used to detect the different spatial regions, and the surface 120 of the bulk material 104 can be also be sampled substantially without mechanical angular adjustment 122 or rotation 110.

In order to facilitate digital beamforming, an antenna apparatus 201, 203 comprising a plurality of transmitter units and receiver units is used, which apparatus is attached to the antenna support 109 or the antenna base 109.

Figure 2:
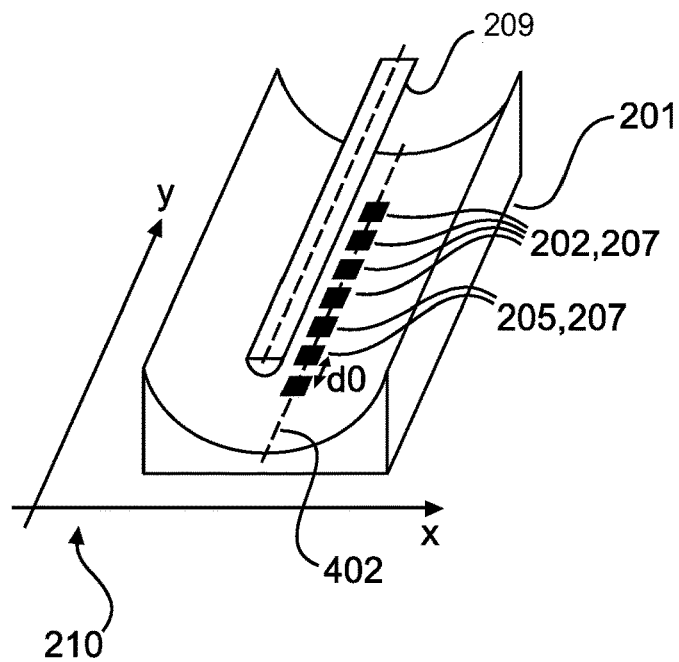
FIG. 2 is a perspective view of a linear parabolic antenna apparatus according to an exemplary embodiment of the present invention.

FIG. 2 is a perspective view of a linear parabolic antenna apparatus 201 or a linear planar antenna apparatus 201 according to an exemplary embodiment of the present invention. Since the transmitter units 202 and the receiver units 205 are arranged so as to be linearly parallel to the y axis, shown in FIG. 2, of the coordinate system 210 denoted by reference sign 210, the antenna apparatus 201 can be designated as a linear array 201. The grouping of the transmitter units 202 and receiver units 205 can be designated as an antenna group. The transmitter elements 202 or the transmitter units 202 are actuated by the control unit 111 and the receiver elements 205 or the receiver units 205 are operated by the analysis unit 123 in order to achieve a desired beam formation and to be able to sample a surface 120 of the bulk material 104 in a specifiable region. In combination with the rotatable antenna holder 108, the parabolic trough 201 or the linear array 201 can be mounted for use on the antenna support 109. The linear array 201 can implement mechanical focusing of the electromagnetic waves emitted by the transmitter units 202 or the antenna elements 202 and/or received by the receiver units 205 in the x direction shown in the coordinate system 210. A linear lens 209 or a linear hyperbolic portion 209 is provided for the mechanical focusing. The corresponding signals are focused in the y direction of the coordinate system 210 or in the linear direction 402 only after the received signals have been detected in the analysis component 123 or analysis unit 123 by DBF. In this way, there can also be targeted control of the main reception direction of the antenna 121 in the y direction. Rather than outright transmitter units 202 and outright receiver units 205, transmitter/receiver units 207 can also be used which can simultaneously transmit receive in the same position. Transmitter units 202, 204 and receiver units 205, 206 may be replaced by transmitter/receiver units 207. The individual transmitter units 202, 204, 207 and/or receiver units 205, 206, 207 are at a distance of $d_0$ from one another and are oriented on a grid.

Figure 3:
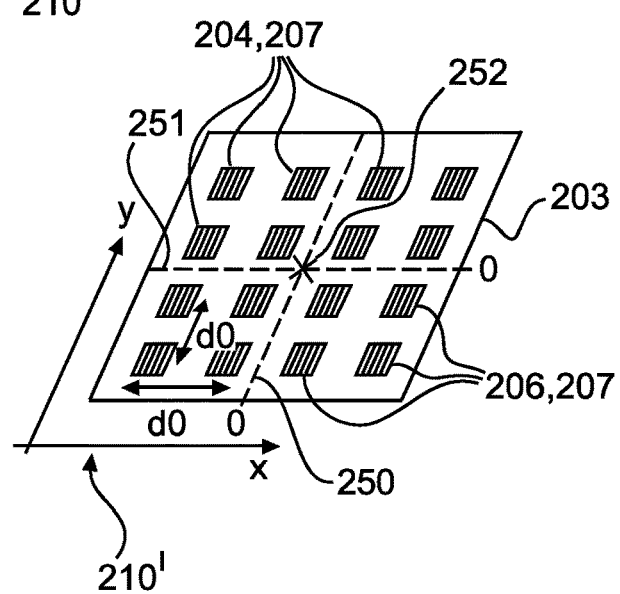
FIG. 3 is a perspective view of a two-dimensional antenna array according to an exemplary embodiment of the present invention.

FIG. 3 shows a two-dimensional (2D) antenna array 203 or a 2D planar antenna apparatus 203 according to an exemplary embodiment of the present invention. The two-dimensional antenna array has an extension in two spatial directions, for example in the x direction and the y direction, as indicated by the coordinate system 210'. FIG. 3 shows the arrangement of the transmitter units 204 and the receiver units 206 on the antenna array 203. Rather than outright transmitter units 204 and outright receiver units 206, transmitter/receiver units 207 can be used which simultaneously transmit and receive in the same position. The individual transmitter units and/or receiver units are at a distance of $d_0$ from one another. In one example, it may also be provided for a plurality i of different grid distances di to be realised within one transmitter unit and/or receiver unit, the distances di being different from $d_0$. An antenna array 203 may be used in combination with a rigid antenna holder 108 and a rigid antenna support 109. In combination with the static antenna holder 108, the two-dimensional antenna array 203 can make it possible to sample in two spatial directions, despite the static arrangement. The two-dimensional antenna array 203 comprises a plurality of transmitter units 204 and/or receiver units 206 along the x axis and along the y axis. Said units are arranged so as to be symmetrical to the axes of symmetry 250 and 251. The transmitter units 204, 207 and receiver units 206, 207 are arranged in a grid-like manner at a grid spacing of $d_0$. Said grid spacing corresponds for example to half the wavelength of the transmission signal used, which signal is triggered in the respective transmitter units 202, 204 by the control unit 111. Complying with the distance of $\lambda/2$ specified by the distance criterion can reduce grating lobes. An appropriately loaded program, configured to actuate and/or analyse the two-dimensional antenna array 203 or the linear antenna array 201, links the signals received by the receiver units 205, 206, 207 according to the two-dimensional digital beamforming method and according to the antenna design 201, 203 used.

For the purpose of the digital beamforming (DBF), and in particular for forming a virtual array, the transmitter units 202, 204 are triggered sequentially or one after the other according to a time-division multiplexing method in order to transmit a transmission signal. In order to achieve the digital beamforming, a specially coded transmission signal, e.g. an orthogonal signal form, can be used as an alternative to the time-division multiplexing method. If a coded transmission signal is used to distinguish between individual transmitters 202, 204, in particular to distinguish between individual transmitter positions, the transmitter units 202, 204 can be triggered to transmit simultaneously. A measurement cycle can be reduced by simultaneous triggering. The coding makes it possible to determine the position of the signal source, despite the simultaneous transmission, in order to be able to distinguish between the signals generated by each of the individual transmitter units 202, 204. Both the time-division multiplexing method and the coding can be used to clearly assign a reception signal to a specific transmitter unit 202, 204, 207 of the plurality of transmitter units 202, 204, 207.

In order to avoid undesirable grating lobes when using the digital beamforming method, the physical distance $d_0$ between two adjacent antenna elements 202, 204, 205, 206, 207 is selected so as to be no greater than (smaller than or equal to) one half of the wavelength of the radar signals, transmission signals and/or reception signals used. This limitation can lead to a large number of antenna elements 202, 205, 204, 206, based on the radar signals in the region of 79 Ghz used in fill level measurement technology.

In addition, when using individual transmitter elements 202, 204 in time-division multiplexing, fill level measurement devices 105 can emit in the direction of the bulk material 104 only with limited transmission power or transmission energy on account of the limited power of available semiconductor components. There is no longer any digital beamforming during emission, and therefore the entire surface 120 of a bulk material or object 104 has to be irradiated or illuminated by means of the transmitter units 202, 204, 207. If a bulk material having weak reflective media properties is intended to be measured by means of such a weak emission, a signal reflected by said bulk material 104 may be so weak that detection is substantially no longer possible.

Figure 4:
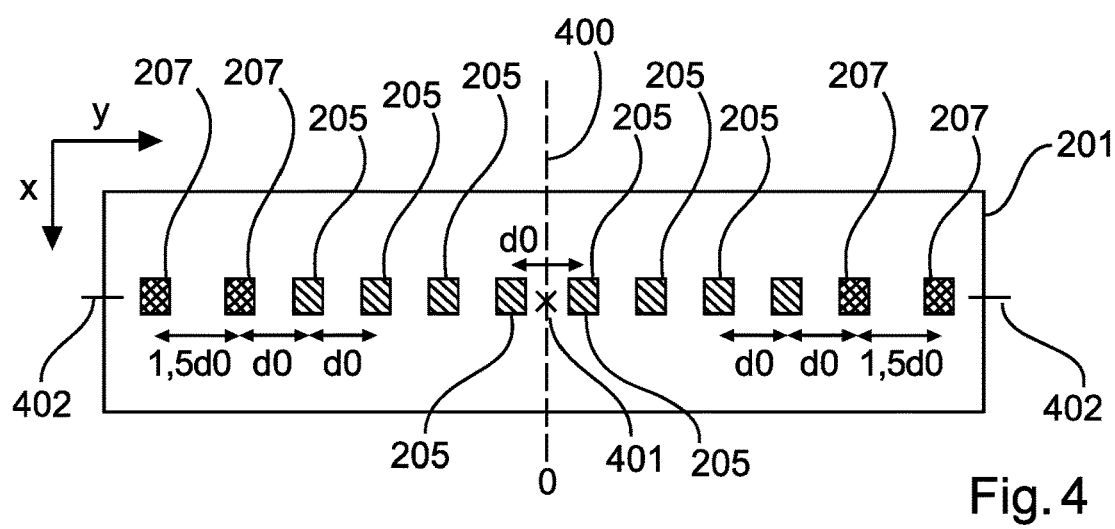
FIG. 4 is a plan view of an antenna apparatus comprising linearly arranged elements according to an exemplary embodiment of the present invention.

FIG. 4 is a plan view of an antenna apparatus 201 or a physical array 201 comprising linearly arranged transmitter units 202 and transmitter/receiver units 207 according to an exemplary embodiment of the present invention. The transmitter/receiver units 207 are used instead of outright receiver units 206, which can only receive. The transmitter/receiver units 207 can be operated, depending on the actuation thereof, either as a transmitter unit 202 or as a receiver unit 205. The antenna apparatus 201 could thus also be made up of only transmitter/receiver units 207, a portion of which are operated as transmitter units 202 and another portion of which are operated as receiver units 205. Consequently, it may be possible to electronically alter the arrangement of the transmitter units 202 and the receiver units 205 or 204 and 206 in the array 203, for example controlled by the control unit 111 or the analysis unit 123.

The transmitter/receiver units 207 and the receiver units 205 are arranged in a rectangular parabolic trough in a manner that is linear with respect to a reference line 402 in the y direction. The y direction extends in parallel with the longer of the four sides of the rectangular linear antenna. In this case, the transmitter/receiver units 207 and the receiver units 205 are oriented on a grid that refers to the transmission signal wavelength that is used. The specifiable positions of the transmitter/receiver units 207 and the receiver units 205 are determined by the grid. The distance $d_0$ between two adjacent elements, i.e. between receiver units 204, 206, between transmitter units 202, 205 and/or transmitter/receiver units 207 is substantially one wavelength or $d_0=\lambda$, and thus does not meet the distance criterion. Proceeding from the reference point 401 on the reference line 400, the first two receiver units 205 are symmetrical with respect to the reference line 400 and are arranged at positions of $d_0/2$ and $-d_0/2$ and/or of $\lambda/2$ and $-\lambda/2$. The size of the grid is $d_0/2$ or $\lambda/2$; however, not all the grid positions are occupied by elements 202, 204, 205, 206, 207. The reference line 400 is an axis of symmetry 400 for the antenna apparatus 201. The next two receiver units 205 are located at $3d_0/2$ and $-3d_0/2$. The next two receiver units are located at $5d_0/2$ and at $-5d_0/2$, and the outermost receiver units 205 are located at $7d_0/2$ and $-7d_0/2$. Therefore, adjacent receiver elements 205 are at the regular distance of $d_0$ or $\lambda$.

In terms of transitioning from the receiver units 205 to the transmitter/receiver units 207, adjacent elements are likewise at the distance of $d_0$. There are transmitter/receiver units 207 at the specifiable positions $9d_0/2$ and $-9d_0/2$ or $9\lambda/2$ and $-9\lambda/2$. The outermost transmitter/receiver units 207 are located at the specifiable positions $12d_0/2$ and $-12d_0/2$ or $12\lambda/2$ and $-12\lambda/2$ and thus deviate from the regular structure.

The two-dimensional physical array 203 from FIG. 3 has a corresponding regular structure, said array being oriented on the reference line 250 in the x direction and on the reference line 251 in the y direction, which can result in a reference point 252 in the centroid of the surface area of the antenna array 203.

FIG. 3 and FIG. 4 show that there is no physical transmitter unit 202, 204, physical receiver unit 205, 206 or physical transmitter/receiver unit 207 arranged at either of the reference points 401, 252. FIG. 4 thus comprises a linear antenna array having eight receiver units 205 and four transmitter/receiver units 207.

The antenna apparatus 201 from FIG. 4 can be actuated in various modes of operation. The control unit 111 and the analysis unit 123 can be adapted accordingly to the modes of operation, for example by a corresponding program being loaded.

A first mode of operation may provide for only one of the plurality of transmitter units 202, 207 to be actuated and for a transmission signal transmitted by the transmitter unit 202, 207 to be received as a reception signal, following reflection, by only one of the plurality of receiver units 205. In this mode of operation, the mechanical adjustment of the antenna apparatus by means of the adjustment unit 108, 109 may ensure that reception signals are received from various spatial angles, and that the surface of the object 104 (not shown in FIG. 4) is sampled. In one example, a horn antenna controlled by a motor may be used, the horn of which antenna is used to orient the electromagnetic signals generated by the transmitter units and/or the receiver units.

In a second mode of operation, the adjustment unit 108, 109 may be rigid or may not be capable of being mechanically moved, and can be oriented at a fixed angle. However, a transmission signal is transmitted by means of at least one of the transmitter units 202, 207 or a plurality of transmitter units 202, 207 and/or a corresponding number of transmitter/receiver units 207 substantially simultaneously. The reflected reception signal is received by at least two receiver units 205, 207 and/or transmitter/receiver units 207. The analysis unit 123 can determine echo curves from a plurality of specifiable spatial directions or from a plurality of main reception directions 101, 102, 103 by applying DBF methods. In this way, the surface of the object 104 can be sampled in a digitally controlled manner.

In a third mode of operation, at least two transmitter units 202, 207 and/or at least two transmitter/receiver units may be operated according to a time-division multiplexing method such that the analysis unit can determine a virtual array. In order to form the virtual array, the analysis unit analyses the reception signals from at least two receiver units 205, 207, the timing pattern of the transmission sequence and/or the position of the individual transmitter elements 202, 207 and receiver elements 205, 207 with respect to one another.

In a fourth mode of operation, in addition to running the third mode of operation, the at least two transmitter units 202, 207 and/or the at least two transmitter/receiver units can be activated simultaneously at a point in time during the time-division multiplexing method in order to emulate an additional transmitter unit.

Irrespective of the mode of operation used for the topology measurement, a fill level measurement device 105 using the antenna apparatus 201, 203 can be configured such that it changes into an outright fill level measurement mode when it identifies a deterioration in reflection conditions and/or in the mechanical components 108, 109. In this case, the timing of the change into the fill level measurement mode may be event-driven or also time-controlled irrespective of a measurement cycle that is used. In order to change into the outright fill level measurement mode, if at least two transmitter units 202, 207 are provided, substantially the number of jointly operated transmitter units may be increased in order to use as many transmitter units 202, 207 as possible and in order to increase the signal strength, the signal power or the signal energy. Signals transmitted simultaneously may overlap such that the energy thereof is combined. During the operation phase of the fill level measurement operation, at least two transmitter units may be activated simultaneously in order to generate a transmission signal and in order for said transmission signal to be received by at least two receiver units, in order to make digital beamforming possible in the direction of maximum reflection and/or other directions. The maximum reflection may refer to the main reception direction from the plurality of main reception directions in which a reception signal has the greatest reception energy and/or the greatest signal-to-noise ratio. When transmitter units are operated simultaneously in order to increase energy, the digital beamforming may take place such that substantially only a single echo curve is determined from a single spatial direction 101, 102, 103 or main reception direction 101, 102, 103. Said single spatial direction 101, 102, 103 may be provided such that it extends substantially perpendicularly to an object surface. In another example, the single spatial direction 101, 102, 103 may be provided such that it extends substantially in parallel with a wall of a container 131. In yet another example, the spatial direction 101, 102, 103 may be selected such that reflected transmission energy that is as large as possible can be detected therefrom. Detecting large, reflected transmission energy or large reception energy can be achieved initially by echo curves being established for a plurality of spatial directions 101, 102, 103 by means of the digital beamforming, and then by the maximum reflected energy being determined for each echo curve. A comparison of these established maximum energy values makes it possible to determine the direction 101, 102, 103 having maximum reflection. If the single echo curve can be established in the direction of this spatial direction having maximum reflection, the fill level can be reliably measured. This maximum reflection direction is often the direction perpendicular to the object surface. If a spatial direction from a different angle is the spatial direction having maximum reflection, the inclination of the spatial direction 101, 102, 103 with respect to the object surface is observed when calculating the distance and, if necessary, is excluded or compensated for.

In the case of mechanical sampling as per the first mode of operation, for the purpose of establishing the single echo curve, the adjustment unit may orient the antenna apparatus such that a reception signal can be received substantially perpendicularly to the object surface and/or in parallel with the container wall. The antenna apparatus 201, 203 may be rigidly held in this position until the quality measure allows another instance of object detection.

If a motor defect is identified in the case of the motor-controlled horn antenna, an error message is generated and output by the analysis unit. If possible, the analysis unit can still orient the horn antenna directly towards the object surface in order to measure the distance from the object surface. If the orientation towards the object surface is not possible, the angle at which the object surface is then detected can be compensated for and/or a warning message can be output stating that a measurement is not possible or that only a limited measurement is possible.

By detecting the echo curve from a single spatial direction during topology measurement, a good s/n ratio (signal/noise ratio) can be achieved when operating a topology-detecting fill level measurement device 105. The time-controlled or event-driven switching of the measurement device into an outright fill level measurement operation, with activation of all the transmitters or with the motor-driven orientation of an antenna apparatus, can be used to improve the s/n even in the case of poorly reflecting media or poor measuring conditions, or can be used to assess plausibility.

By means of the antenna apparatus and the method, an arrangement 201, 203 of transmitter units 202, 204, 207 and receiver units 205, 206, 207 that is used for digital beamforming and for detecting the surface topology of a bulk material can be used to comply with a quality measure for a measurement. If the quality measure deviates from a specifiable threshold or in the case of an error, at least two of the available transmitter elements can be activated simultaneously and/or an error message is output. Said simultaneous activation can be used so that more transmission energy is emitted towards the medium 104 to be measured, and therefore the achievable s/n is improved in particular in the case of poorly reflecting media. In one example, a plausibility assessment of the 3D measurement can be carried out by means of a fill level measurement in a single spatial direction.

The mode of operation of a fill level measurement device that is provided for detecting the topology of a bulk material surface can be switched into a mode of operation in which a simple fill level measurement is carried out at a very high level of sensitivity and/or at a very high measurement rate. The sensitivity can also be increased by the transmission energy being increased, for which purpose an energy adjustment unit is used, which may be part of the control unit.

The common benefit of the elements 202, 204, 205, 206, 207 of an antenna apparatus can lead to a compact design of a topology/fill level measurement device 105 having plausibility measurement, since two separate measurement devices do not have to be provided, specifically a fill level measurement device for a fixed spatial direction and a topology measurement device for detecting the surface.

The plausibility measurement can be carried out as an additional measurement, for example in a time-controlled manner according to each measurement cycle in which an echo curve has been determined from a specifiable spatial direction. In another example, the plausibility assessment can be added as a correction and a plausibility measurement in a time-controlled manner according to a specifiable number of performed measurement cycles. In yet another example, the plausibility measurement be carried out in an event-driven manner only if a quality measure is exceeded and/or if an error occurs. For this purpose, the analysis unit may regularly monitor the quality measure and/or the functioning of the adjustment unit. If an error occurs and/or if the results of a fill level measurement by means of the topology measurement and the results obtained from the plausibility measurement differ from a previously defined tolerance threshold or quality measure, or if a specified quality measure of one of the two measurements is not met, the topology measurement device 105 or the fill level measurement device 105 can generate a warning message. The topology measurement may take place with the aid of a time-division multiplexing method and/or the additional activation of at least two transmitter units. The plausibility measurement may take place by way of a normal bulk material measurement or fill level measurement together with simultaneous activation of the transmitter units.

Figure 5:
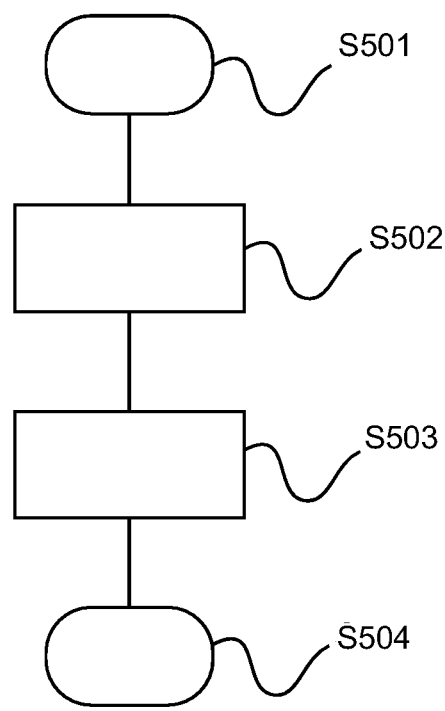
FIG. 5 is a flow diagram of a method for operating an antenna apparatus according to an exemplary embodiment of the present invention.

FIG. 5 is a flow diagram of a method for operating an antenna apparatus according to an exemplary embodiment of the present invention. The method for operating an antenna apparatus begins in the beginning state S501. In the step S502, the method provides for a transmission signal to be transmitted by means of at least one first transmitter unit, and for at least two reception signals to be received by means of a first receiver unit. The method further provides for determining a profile of a surface of an object from the at least two reception signals received. In the step S503, if an error is identified when determining the profile of the surface of the object, the control unit is actuated such that the analysis unit determines a distance of the surface of the object from the transmitter unit and/or from the receiver unit instead of determining the profile of the surface of the object. As a result, there is a switch from topology measurement to outright fill level measurement. The method ends in the step S504.

Alternatively, in the step S502, the method can transmit a transmission signal by means of the at least one transmitter unit, and can receive at least two reception signals by means of at least one receiver unit in a manner that is delayed by the signal delay between the object surface and back. For example, in order to receive two reception signals, a transmitter unit is simultaneously operated in a reception operating mode, i.e. as a transmitter/receiver unit. Or, for example in the case of mechanical sampling, the position of the transmitter unit and/or the receiver unit is moved on and a new transmission signal is transmitted in order to obtain at least two reception signals.

If a plurality of transmitter units and a plurality of receiver units are used, a number of transmission signals can be sent which corresponds at most to the number of available transmitter units. A number of reception signals can also be received which corresponds at most to the number of available receiver units. Furthermore, at least two echo curves are determined, from the at least two reception signals, for at least two specifiable spatial directions in order to detect a surface of an object.

In the step S503, a quality measure is determined for the at least two reception signals and this quality measure is compared with a specifiable threshold value or a specifiable limit. If the quality measure deviates from this specifiable threshold value for the quality measure for the at least two reception signals, an energy of the transmission signal is increased and substantially only a single echo curve is determined for a single specifiable spatial direction. There is thus a switch from multidimensional topology measurement to one-dimensional measurement. For example, there is a switch from multidimensional fill level measurement to one-dimensional measurement.

In addition, it should be mentioned that the terms "comprising" and "having" do not exclude any other elements or steps, and "a" or "an" does not rule out more than one. It should further be pointed out that features or steps described with reference to one of the above embodiments may also be used in combination with other features or steps of other above-described embodiments. Reference signs in the claims shall not be deemed to have a limiting effect.

The invention claimed is:

1. An antenna apparatus, comprising:
at least one first transmitter;
at least one first receiver;
processing circuitry configured to:
transmit a transmission signal by means of the at least one first transmitter,
receive at least two reception signals by the at least one first receiver,
operate the at least one first transmitter in order to determine a profile of a surface of an object from the at least two reception signals received,
identify an error when determining the profile of the surface of the object, and
upon identifying the error, determine, based on a single distance measurement, a distance of the surface of the object from the transmitter and/or from the receiver instead of determining the profile of the surface of the object based on a plurality of distance measurements across the surface of the object.

2. The antenna apparatus according to claim 1, wherein the
processing circuitry is further configured to
determine, from the at least two reception signals, at least two echo curves for at least two specifiable spatial directions in order to detect the profile of the surface of the object,
determine a quality measure for the at least two reception signals in order to identify the error when determining the profile of the surface of the object,
instruct, when the quality measure deviates from a specifiable threshold for the
quality measure for the at least two reception signals, the transmitter to increase an energy of the transmission signal, and
determine a single echo curve for a single specifiable spatial direction.

3. The antenna apparatus according to claim 2, further comprising:
at least one second receiver,
wherein the processing circuitry is further configured to:
receive by each of the at least one first receiver and the at least one second receiver one of the at least two reception signals, and
transmit, when the quality measure deviates from the specifiable threshold for the quality measure, an additional transmission signal in order to increase the energy of the transmission signal and in order to facilitate determination of echo curves for the single specifiable spatial direction.

4. The antenna apparatus according to claim 3, further comprising:
at least one second transmitter,
wherein the processing circuitry is further configured to:
operate the at least one first transmitter and the at least one second transmitter in a time-division multiplexing mode, a frequency-division multiplexing mode and/or in a code-division multiplexing mode,
determine, by analyzing the reception signals that are induced by the at least two transmitters that are operated in the time-division multiplexing mode, in the frequency-division multiplexing mode and/or in the code-division multiplexing mode, at least two echo curves for at least two specifiable spatial directions by applying a digital beamforming method, and
switch, when the quality measure deviates from the specifiable threshold for the
quality measure for the reception signals, from the time-division multiplexing mode, from the frequency-division multiplexing mode and/or from the code-division multiplexing mode into a parallel operation of the at least one first transmitter and/or of the at least one second transmitter and/or at least one of the first receiver and the second receiver in order to increase the energy of the transmission signal and in order to determine an echo curve for a single specifiable spatial direction.

5. The antenna apparatus according to claim 2, further comprising:
an adjustment device configured to mechanically adjust the at least one first receiver into at least two specifiable spatial directions in order to receive the at least two reception signals from at least two spatial directions,
wherein, when the quality measure deviates from the specifiable threshold for the quality measure of the at least two reception signals, the processing circuitry further configured to instruct the adjustment device to be fixed in the single specifiable spatial direction in order to increase the energy of the transmission signal, and in order to facilitate determination of the single echo curve for the single specifiable spatial direction.

6. The antenna apparatus according to claim 5, further comprising:
an additional transmitter,
wherein the processing circuitry is further configured to transmit an additional
transmission signal by the additional transmitter while the adjustment device is fixed in the single specifiable spatial direction.

7. The antenna apparatus according to claim 2, further comprising:
an energy adjustment device, wherein the energy adjustment device is configured to be instructed by the transmitter to increase the energy of the transmission signal.

8. The antenna apparatus according to claim 2, wherein adjacent transmitters and/or receivers are at a distance smaller than or equal to half of the wavelength of the transmission signal.

9. The antenna apparatus according to claim 1, wherein the antenna apparatus is a two-line device.

10. The antenna apparatus according to claim 1, further comprising:
an adjustment device configured to mechanically adjust the at least one first transmitter and/or the at least one first receiver in order to determine the profile of the surface of the object by mechanically adjusting the at least one first transmitter and/or the at least one first receiver,
wherein the processing circuitry is configured to fix the adjustment device in a specifiable position upon identification of the error, and to determine the distance of the surface of the object from the transmitter and/or from the receiver in this fixed position.

11. The antenna apparatus according to claim 10, wherein the at least one first transmitter and/or the at least one first receiver is/are surrounded by an antenna horn.

12. A fill level measurement device comprising the antenna apparatus according to claim 1.

13. A method of operating an antenna apparatus, comprising:
transmitting a transmission signal by at least one first transmitter;
receiving at least two reception signals by at least one first receiver;
determining a profile of a surface of an object from the at least two reception signals received:
identifying an error when determining the profile of the surface of the object; and
upon identifying the error, determining, based on a single measurement, a distance of the surface of the object from the transmitter and/or from the receiver instead of determining the profile of the surface of the object based on a plurality of measurements across the surface of the object.

\* \* \* \* \*